US007825560B2

(12) United States Patent
Lee et al.

(10) Patent No.: US 7,825,560 B2
(45) Date of Patent: Nov. 2, 2010

(54) MOTOR

(75) Inventors: Sung-Ho Lee, Seoul (KR); Jae-Hak Choi, Seoul (KR); Jin-Soo Park, Seoul (KR)

(73) Assignee: LG Electronics Inc., Seoul (KR)

( * ) Notice: Subject to any disclaimer, the term of this patent is extended or adjusted under 35 U.S.C. 154(b) by 417 days.

(21) Appl. No.: 11/905,327

(22) Filed: Sep. 28, 2007

(65) Prior Publication Data

US 2008/0218022 A1 Sep. 11, 2008

(30) Foreign Application Priority Data

Mar. 8, 2007 (KR) ..................... 10-2007-0023205

(51) Int. Cl.
*H02K 21/12* (2006.01)

(52) U.S. Cl. ............................. 310/156.57; 310/216.8; 310/216.17

(58) Field of Classification Search ............................... 310/156.53–156.57, 216.121–216.123, 216.008, 310/216.17
See application file for complete search history.

(56) References Cited

U.S. PATENT DOCUMENTS 4,568,846 A * 2/1986 Kapadia ................ 310/156.83
5,760,520 A * 6/1998 Hasebe et al. .......... 310/156.19
RE36,367 E * 11/1999 Nagate et al. .......... 310/156.54
6,218,753 B1 4/2001 Asano et al.
6,774,521 B2 8/2004 Inayama et al.
7,057,322 B2 * 6/2006 Araki et al. ............ 310/156.53
7,119,507 B2 10/2006 Nishijima
2003/0090167 A1 * 5/2003 Kajiura et al. ......... 310/156.36
2004/0145263 A1 * 7/2004 Kojima et al. .......... 310/156.23
2006/0043812 A1 * 3/2006 Cheong et al. ......... 310/156.53
2006/0279158 A1 * 12/2006 Kim ........................... 310/216
2008/0136281 A1 * 6/2008 Fujii et al. ............. 310/156.08

FOREIGN PATENT DOCUMENTS

EP 1 628 381 2/2006
JP 11-299199 10/1999
KR 1999-0065127 8/1999

* cited by examiner

*Primary Examiner*—Thanh Lam
(74) *Attorney, Agent, or Firm*—McKenna Long & Aldridge LLP

(57) ABSTRACT

A motor that reduces a cogging torque and rotates at a high speed is presented. The motor comprises: a shaft, a plurality of core blocks coupled to the shaft, a plurality of permanent magnets inserted into each of the core blocks, and an aligning unit, coaxial with the shaft, and disposed between the shaft and the core blocks. The core block includes a plurality of core sheets each having at least a pair of flux barriers formed to be symmetrical to each other about a line of symmetry. A first rib lies along the line of symmetry and a separate anti-deformation rib is positioned within each of the pair of flux barriers. Accordingly, a skew process for a rotor is facilitated. An anti-deformation rib within the flux barrier provides structural integrity for the core block. Accordingly, when the rotor is rotated with a high speed, a bridge is prevented from being deformed.

13 Claims, 6 Drawing Sheets

20
200
400
10
300
100

MOTOR

This application claims priority to Korean Application No. 10-2007-0023205, filed on Mar. 8, 2007, which is expressly incorporated by reference herein in its entirety.

BACKGROUND

1. Field of the Disclosure

The present disclosure relates to a motor, and more particularly, to a motor capable of reducing a cogging torque and being rotated with a high speed.

2. Description of the Related Art

A motor is a device for converting electric energy into mechanical energy, and is used in all kinds of devices as a driving source.

Motors are generally identified as either a direct current motor or an alternating current motor, according to a power source. The alternating current motor is classified into an induction motor, a synchronous motor, and a commutator motor.

A rotor of the synchronous motor includes a shaft, a plurality of core blocks coupled to the shaft, and a permanent magnet inserted into each of the core blocks.

When power is supplied to a stator of the motor, a magnetic force is generated between the permanent magnet of the rotor and a coil of the stator thereby causing rotation of the rotor. Herein, as a position of the permanent magnet is changed with respect to the stator, the magnetic force is changed. Accordingly, a cogging torque is generated. The cogging torque may cause noise and vibration of the motor.

In order to reduce the cogging torque, an insulating plate is disposed between the core blocks of the rotor. Then, the plurality of core blocks are laminated to each other so that the permanent magnets can be disposed in a zigzag form. Then, the core blocks are assembled to each other using one or more rivets. The above process is called a skew process. The permanent magnets of the core blocks are disposed so that each center thereof can have a phase difference from each other. Accordingly, when the rotor is rotated, an intensity of the magnetic force generated between the permanent magnet and the stator is gradually changed as a position of the permanent magnet is changed. As a result, the cogging torque is reduced.

When power is supplied to the stator, a magnetic force by the permanent magnet may be leaked to an outer circumferential surface of the core block without being attenuated at the coil of the stator. In order to solve the problem, a flux barrier is formed at both ends of the permanent magnet. Preferably, the flux barrier has a large size so as to minimize a flux leakage.

However, the conventional motor has high production costs at least due to the skew process by which a plurality of the core blocks are laminated to each other so that the permanent magnets can be disposed in a zigzag form, and due to the assembly of the core blocks to each other using one or more rivets.

Furthermore, the flux barrier is formed to have a large size, whereas a bridge formed between an outer circumferential surface of the core block and the flux barrier is formed to have a thin thickness. Accordingly, a structural intensity of the core block is low, and thus the bridge is deformed or damaged due to a strong centrifugal force when the rotor is rotated with a high speed.

SUMMARY

Therefore, one advantage of the embodiments of the present disclosure is to provide a motor capable of reducing a cogging torque.

Another advantage is to provide a motor capable of being rotated with a high speed by preventing a rotor from being deformed or damaged.

To achieve these and other advantages and in accordance with the purpose of the present disclosure, as embodied and broadly described herein, there is provided in one embodiment, a motor, comprising: a shaft; a plurality of core blocks coupled to the shaft; a plurality of permanent magnets inserted into each of the core blocks; and an aligning unit coaxial with the shaft and disposed between the shaft and the core blocks, for arranging the permanent magnets with a phase difference from each other in a rotation direction.

According to another embodiment, there is provided a motor, comprising: a shaft; a plurality of core blocks coupled to the shaft; and a plurality of permanent magnets inserted into each of the core blocks, wherein the core block comprises: a core sheet having a flux barrier for preventing a leakage of a magnetic flux; and an anti-deformation rib for preventing the flux barrier from being deformed.

According to still another embodiment, there is provided a motor, comprising: a shaft; a plurality of core blocks coupled to the shaft; a plurality of permanent magnets inserted into each of the core blocks; and an aligning unit coaxial with the shaft and disposed between the shaft and the core blocks, for arranging the permanent magnets with a phase difference from each other in a rotation direction, wherein the core block comprises: a core sheet having a flux barrier for preventing a leakage of a magnetic flux; and an anti-deformation rib for preventing the flux barrier from being deformed.

The foregoing and other features, aspects, and advantages of the present disclosure will become more apparent from the following detailed description of the present disclosure when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION

Reference will now be made in detail to embodiments of the present disclosure, examples of which are illustrated in the accompanying drawings.

Hereinafter, a motor according to the present invention will be explained.

Figure 1:
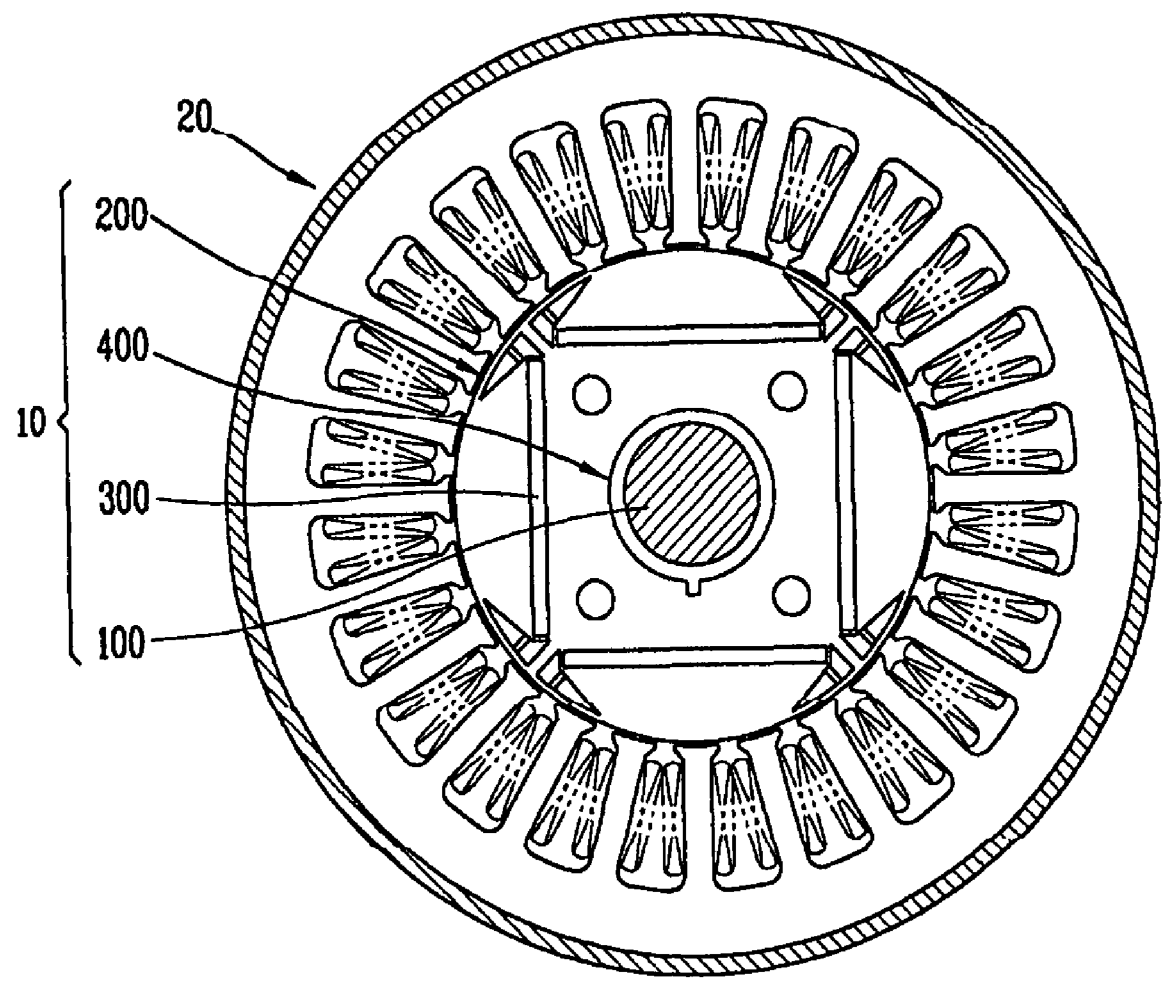
FIG. 1 is a view showing a motor according to a first embodiment of the present invention.
Figure 2:
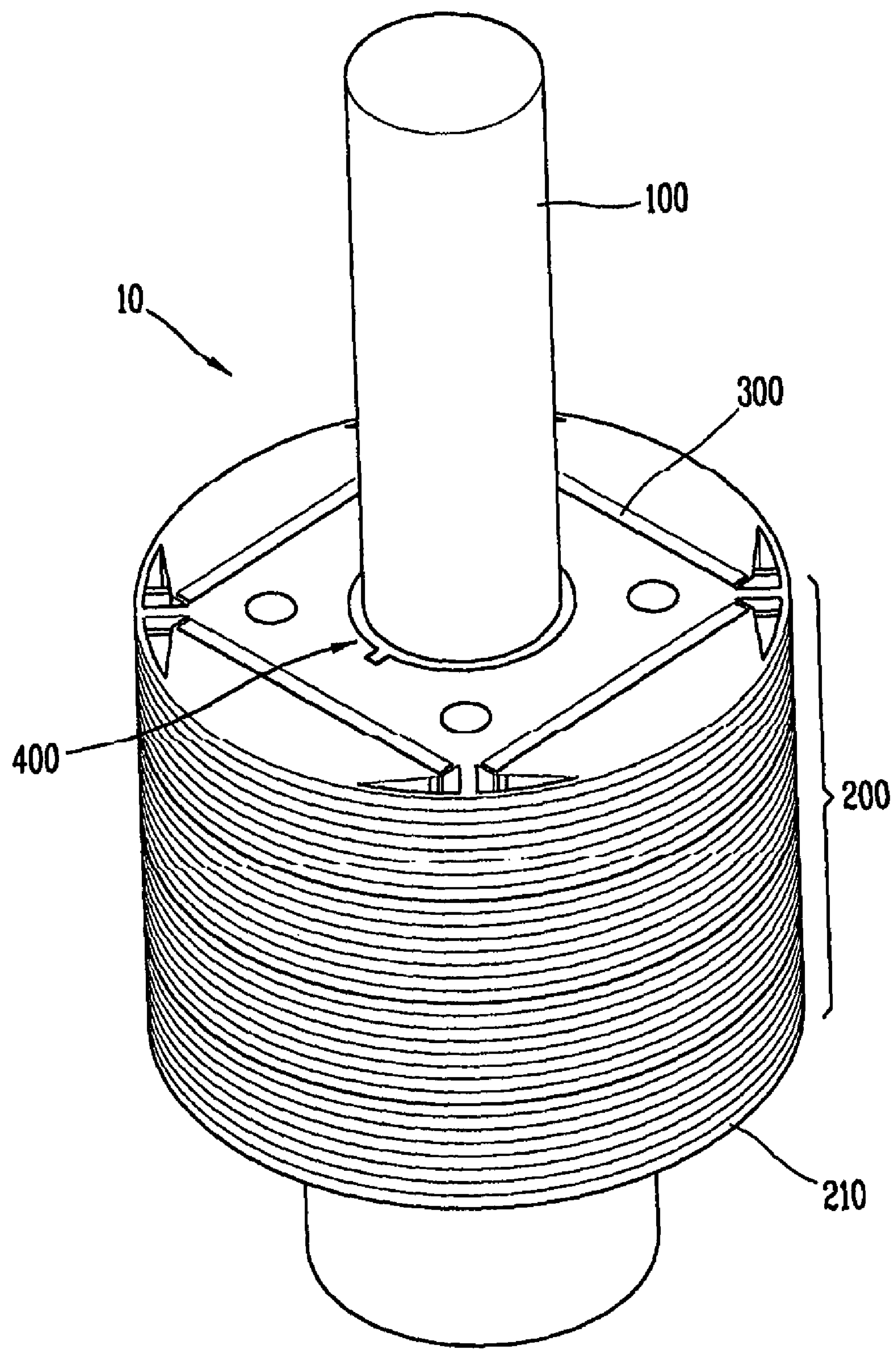
FIG. 2 is a perspective view showing a rotor of the motor of FIG. 1.

FIG. 1 is a view showing a motor according to a first embodiment of the present invention, and FIG. 2 is a perspective view showing a rotor of the motor of FIG. 1.

Referring to FIGS. 1 and 2, the motor according to a first embodiment of the present invention comprises a rotor 10 and a stator 20. The rotor 10 includes a shaft 100; a plurality of core blocks 200 coupled to the shaft 100; a plurality of permanent magnets 300 inserted into each of the core blocks; and an aligning unit 400 coaxial with the shaft 100 and disposed between the shaft 100 and the core blocks 200, for arranging the permanent magnets 300 with a phase difference from each other in a rotation direction.

The shaft 100 may have a bar shape and a circular cross-section. A plurality of core blocks 200 may be laminated to each other may be coupled to the shaft 100 in a longitudinal direction of the shaft 100.

Figure 3:
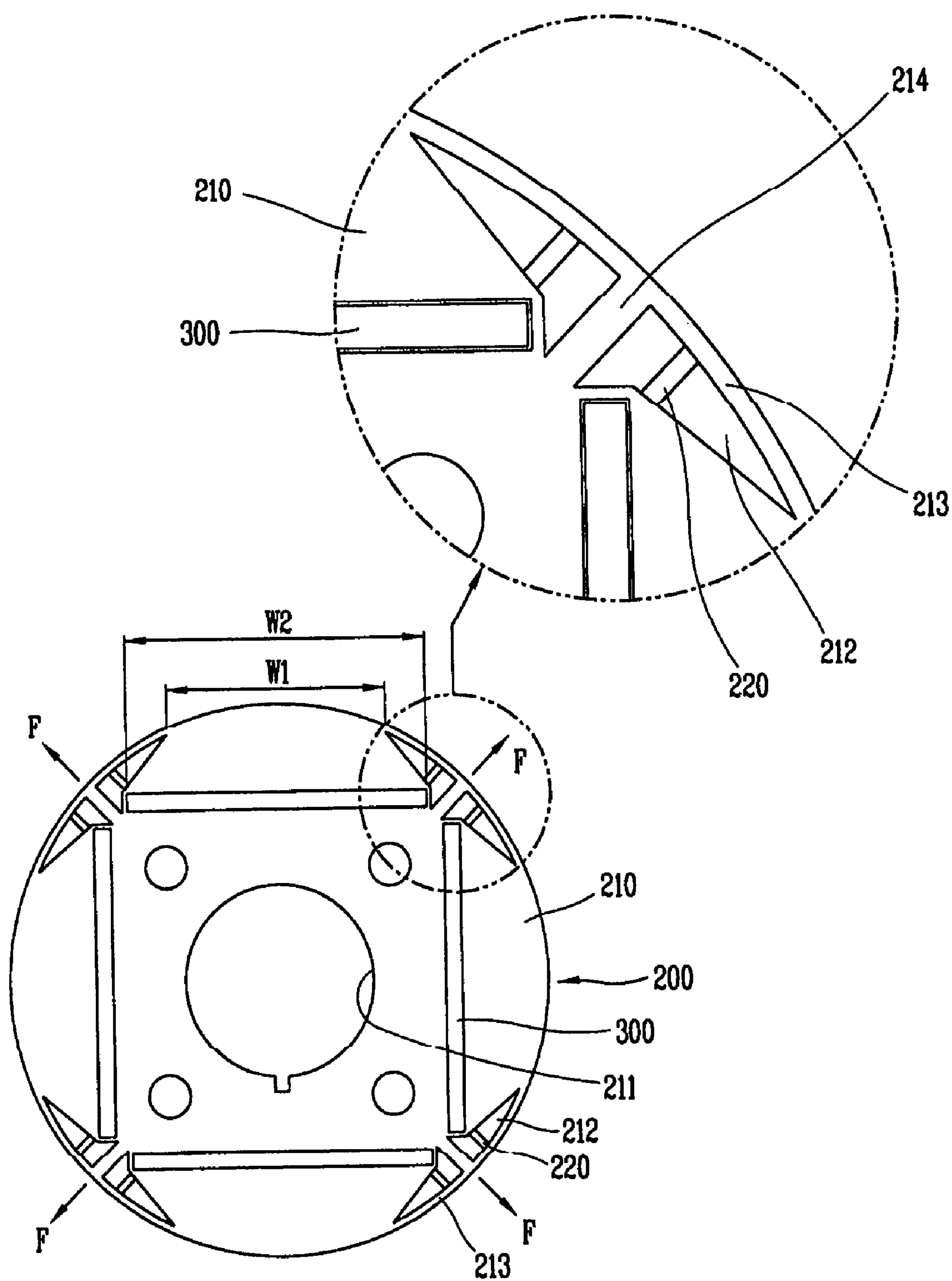
FIG. 3 is a view showing a coupled state between a core block and a permanent magnet of the rotor of FIG. 2.

FIG. 3 is a view showing a coupled state between a core block and a permanent magnet of the rotor of FIG. 2.

As shown in FIG. 3, the core block 200 consists of one or more core sheets 210.

The core sheet 210 may be formed of a steel plate, and includes a coupling hole 211 for coupling the shaft 100; and a punched-out or open space defining a flux barrier 212. The flux barrier 212 acts to prevent a magnetic flux of the permanent magnet 300, that flows in a radial direction of the core sheet 210, from leaking to an outer circumferential surface of the core block 200.

The coupling hole 211 may be formed at a center of the core sheet 210, and may be formed at each of the core blocks 200 with a different diameter.

The flux barrier 212 may be formed to be spaced from both ends of each of the permanent magnets 300, and has a width that decreases towards a center of each permanent magnet 300 from the both ends of each permanent magnet 300. The flux barriers 212 may be formed to be symmetrical to each other about an imaginary line between two adjacent permanent magnets 300. A first rib 214 may along the imaginary line of symmetry. The first rib 214 may be integrally formed with each core sheet (that is, each core sheet may have four first ribs, as depicted in the illustration of FIG. 3. One edge of the first rib 214 may act as an edge of the punched-out or open space defining a flux barrier 212. Another edge of the punched-out or open space defining a flux barrier 212 may be formed by the bridge 213, which is formed at the peripheral portion of the flux barrier 212. The bridge 213 may span more than one flux barrier 212.

An interval W1 between the flux barriers 212 of a given permanent magnet 300 may be narrower than a width W2 of the given permanent magnet 300. An anti-deformation rib 220, that supports the bridge 213 may be formed within the punched-out or open space defining the flux barrier 212. The anti-deformation rib 220 may be insertion-installed in the space defining the flux barrier 212. In one embodiment (not shown), the anti-deformation rib 220 may be formed as an integral portion of the core sheet 210 so as to simplify an assembly process and thus to reduce a fabrication cost. The anti-deformation rib 220 may be disposed within the flux barrier 212 so as to cross the flux barrier 212. In one embodiment, the anti-deformation rib 220 may be disposed in a centrifugal force direction so as to prevent a deformation of the flux barrier 212 (which deformation may result from a deformation of the bridge 213) due to an electromagnetic suction force F generated when the motor is rotated.

The permanent magnet 300 may be spaced from the flux barrier 212, and the anti-deformation rib 220 may be installed within the flux barrier 212. Accordingly, a structural integrity of the core block 200 becomes high, thereby preventing the flux barrier 212 from being deformed when the rotor 10 is rotated at a high speed.

The permanent magnets 300 are inserted into each of the core blocks 200 at a circumference side, thereby forming a polygonal shape. The permanent magnets 300 generate a magnetic force when power is supplied to the stator 20, thereby rotating the rotor 10.

Figure 4:
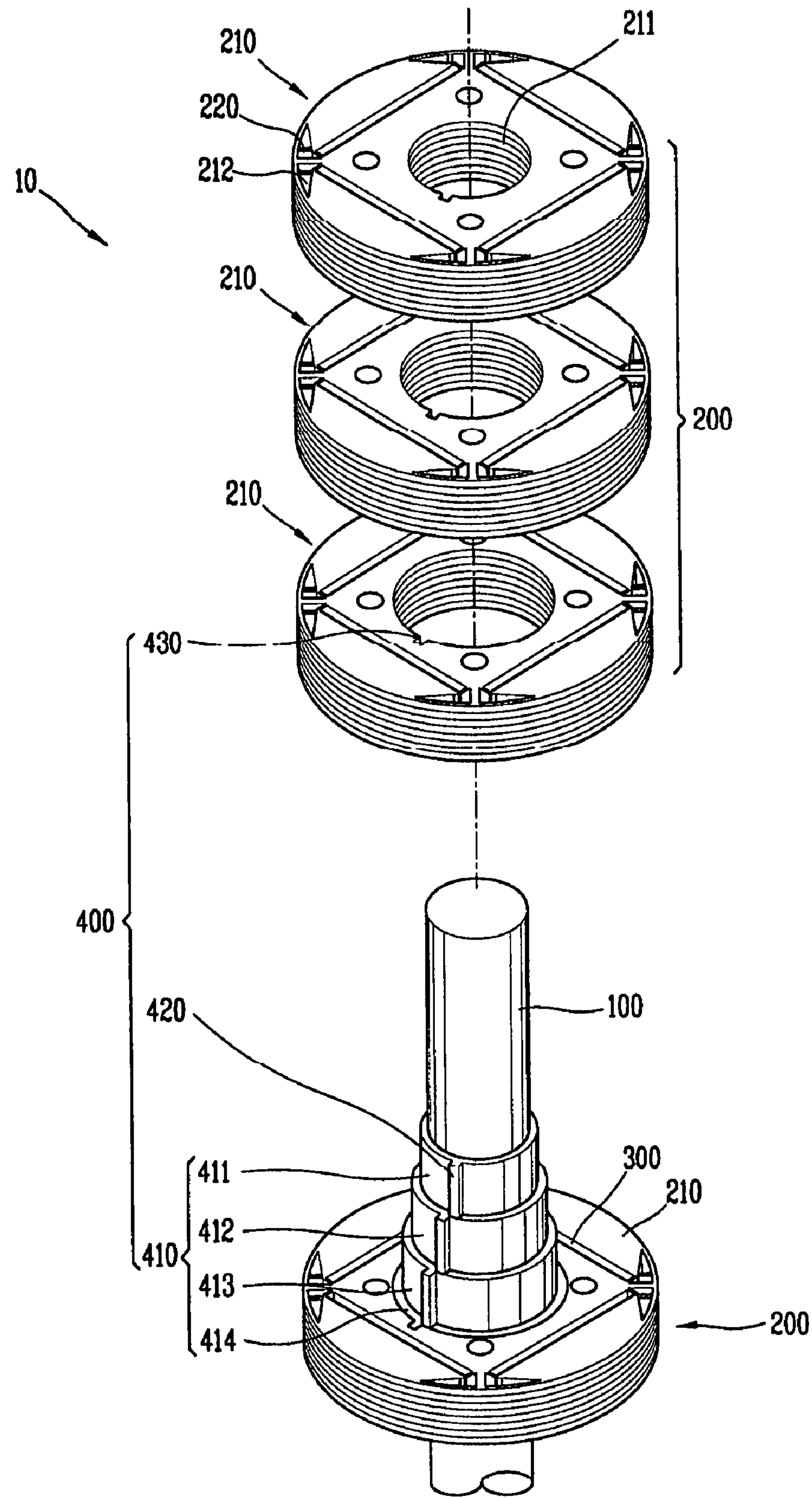
FIG. 4 is a view showing a coupled state between a shaft and the core block of the rotor of FIG. 2.

FIG. 4 is a view showing a coupled state between the shaft and the core block of the rotor of FIG. 2.

According to one embodiment, the aligning unit 400 includes a coupling member 410 formed on an outer circumference of the shaft 100, a coupling protrusion 420 spaced apart from the surface of the shaft 100, and a coupling groove 430 formed at the core block 200 (within or as an integral portion of the coupling hole 211).

Coupling layers 411, 412, 413 and 414 are respectively disposed to cover the outer circumference of the shaft 100 with diameters gradually increased towards a lower side in a longitudinal direction of the shaft 100. The core blocks 200 having the coupling holes 211 of different diameters are respectively coupled to the coupling layers 411, 412, 413 and 414 of the coupling member 410.

The coupling protrusion 420 may be formed on an outer circumferential surface of the coupling member 410 formed at the shaft 100. The coupling protrusion 420 may be in a longitudinal direction of the shaft 100. The coupling protrusions 420 may be formed on each of the coupling layers 411, 412, 413 and 414 with a gap therebetween in a rotation direction of the rotor 10. That is, the coupling protrusions 420 may be offset from one another in a circumferential manner.

The coupling groove 430 may be disposed inside the coupling hole 211 formed at the core block 200, and may be coupled to the coupling protrusion 420 when the core block 200 and the shaft 100 are coupled to each other.

Figure 5:
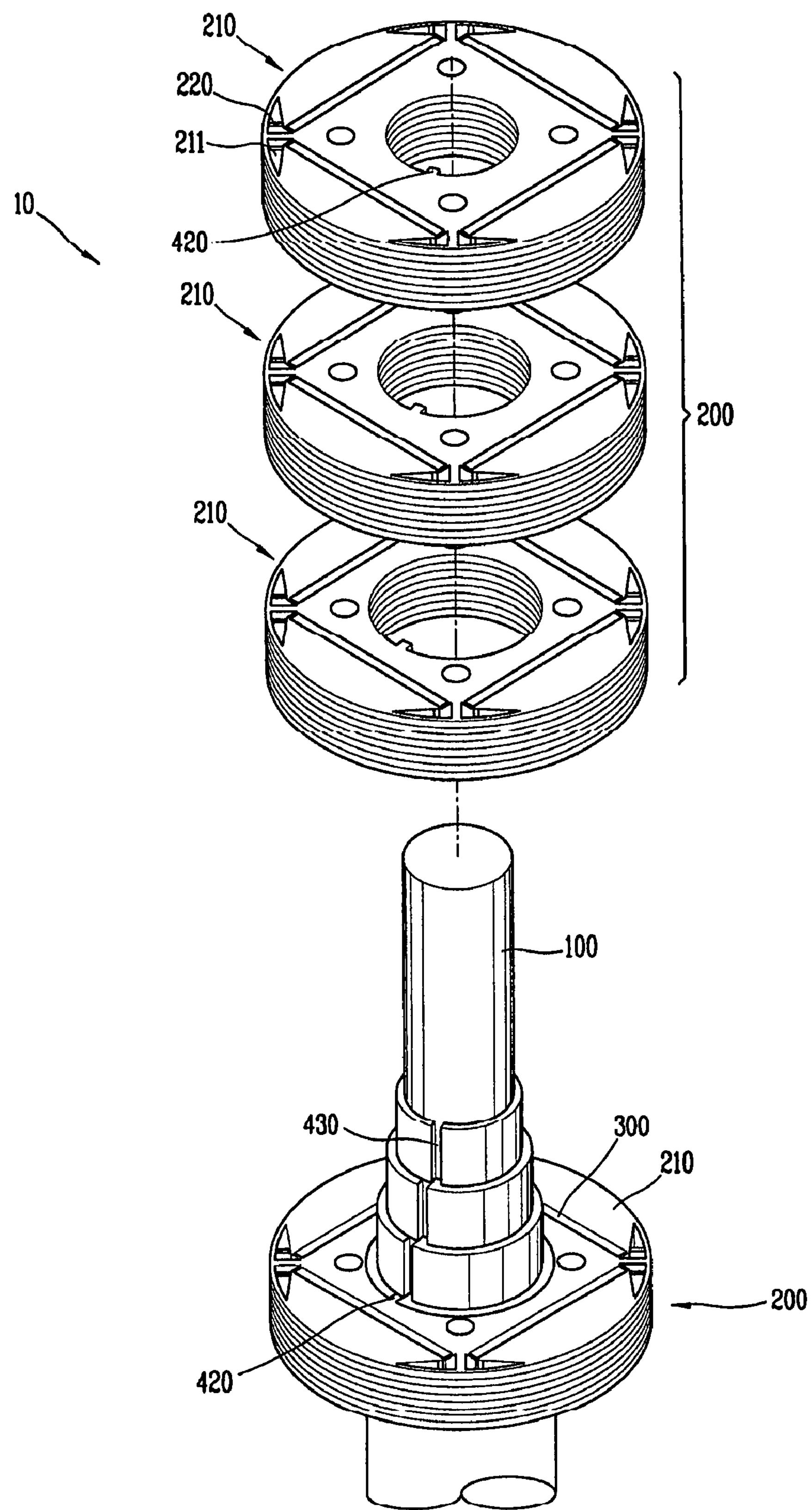
FIG. 5 is a modification of the example of FIG. 4, in accordance with an embodiment of the invention.

FIG. 5 is a modification of the example of FIG. 4, in accordance with an embodiment of the invention.

Referring to FIG. 5, the coupling protrusion 420 may be formed at the core block 200, and the coupling groove 430 may be formed at the shaft 100.

When the shaft 100 and the core blocks 200 are assembled to each other so that the coupling protrusion 420 and the coupling groove 430 can be coupled to each other, the permanent magnets of the core blocks are arranged with a phase difference between themselves in a rotational direction. Accordingly, a skew process for the rotor 10 is facilitated.

Operation of the motor according to the first embodiment of the present invention will be explained.

Figure 6:
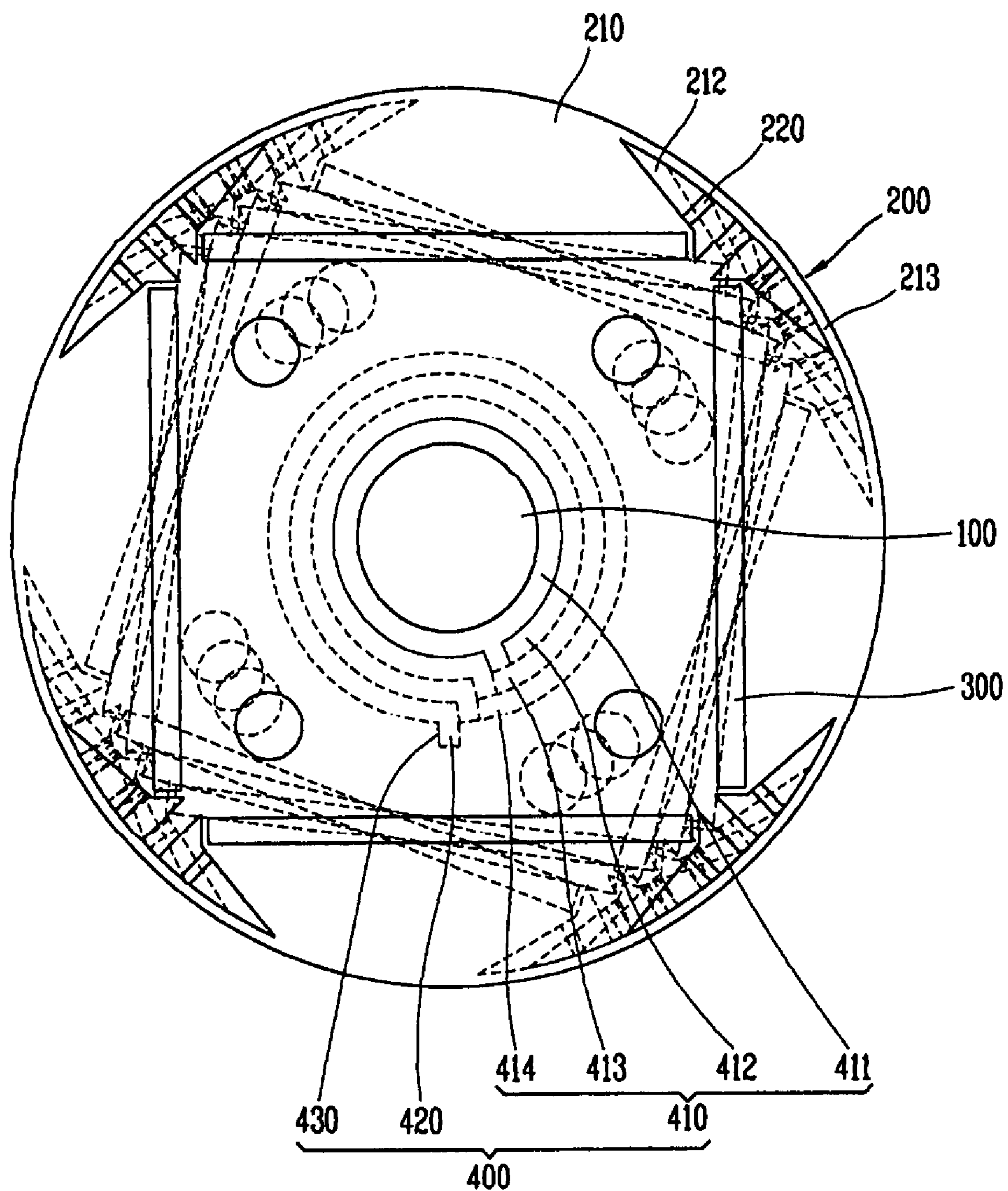
FIG. 6 is a view along an axis of the shaft showing a plurality of core sheets of FIG. 3 arranged on top of one another in accordance with an embodiment of the invention.

FIG. 6 is a view along an axis of the shaft 100 showing a plurality of core sheets 210 of FIG. 3 arranged on top of one another in accordance with an embodiment of the invention.

Referring to FIGS. 4, 5, and 6, when the shaft 100 and a plurality of core blocks 200 are coupled to each other via the coupling member 410, the coupling protrusions 420 and the coupling grooves 430 of the aligning unit 400 may permit each coupling block of the plurality of coupling blocks 200 to be disposed in a rotational alignment with respect to an adjacent coupling block(s). By disposing the coupling protrusions 420 on the coupling layers 411, 412, 413 and 414 of the coupling member 410 in a rotational alignment, as shown in FIG. 6, the permanent magnets 300 inserted into each of the core blocks 200 are disposed so as to have a phase difference, in comparison to one another, in a rotation direction of the rotor 10.

When the shaft 100 and the core blocks 200 are coupled to each other by the aligning unit 400, the permanent magnets 300 may be laminated. Accordingly, a skew process for the rotor 10 is facilitated.

When power is supplied to the stator, a rotation magnetic field is generated at the coil of the stator 20. By a magnetic force between the permanent magnet 300 and the coil of the stator 20, the rotor 10 is rotated.

The permanent magnets 300 are disposed to have a phase difference from each other in a rotation direction by the aligning unit 400. When the permanent magnets 300 are rotated, an intensity of a magnetic force generated between the coil of the stator 20 and the permanent magnets 300 is gradually changed. Accordingly, a cogging torque and a vibration of the motor are prevented from occurring or reduced in intensity.

A magnetic flux of the permanent magnet 300 may be prevented from leaking to an outer circumferential surface of the core block 200 by the flux barriers 212 disposed at both ends of the permanent magnet 300.

Furthermore, the flux barriers 212 are spaced from both ends of the permanent magnet 300, and the anti-deformation rib 220 may be installed in the flux barrier 212 in a direction of a centrifugal force generated when the rotor is rotated. Accordingly, a peripheral portion of the flux barrier 212 of the core block 200 has a firm structure, thereby preventing the bridge 213 from being damaged or deformed.

As aforementioned, in the present invention, when the shaft and the core block are assembled to each other so that the coupling protrusion and the coupling groove can be coupled to each other, the permanent magnets are arranged so as to have a phase difference from each other in a rotation direction. Accordingly, a skew process for the rotor is facilitated.

Furthermore, since the permanent magnet and the flux barrier are spaced from each other and the anti-deformation rib may be installed in the flux barrier, a structural intensity of the core block becomes high. Accordingly, when the rotor is rotated with a high speed, the bridge may be prevented from being deformed.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A motor, comprising:

a shaft;

a plurality of core blocks coupled to the shaft;

a plurality of permanent magnets inserted into each of the plurality of core blocks; and an aligning unit, coaxial with the shaft, and disposed between the shaft and the core blocks, that arranges the permanent magnets with a phase difference from each other in a rotation direction, wherein each core block in the plurality of core blocks comprises:

a plurality of core sheets each having at least a pair of flux barriers formed to be symmetrical to each other about a line of symmetry;

a first rib that lies along the line of symmetry; and an anti-deformation rib, separate from the first rib, within each of the pair of flux barriers, wherein each anti-deformation rib prevents the flux barrier that encloses it from being deformed.

2. The motor of claim 1, wherein the aligning unit comprises a coupling member formed on an outer circumference of the shaft.

3. The motor of claim 2, wherein the coupling member comprises a plurality of coupling layers.

4. The motor of claim 2, wherein the aligning unit further comprises:

a coupling protrusion formed on one of the coupling member and the core block; and a coupling groove formed on the other of the coupling member and the core block, for inserting the coupling protrusion.

5. The motor of claim 4, wherein the coupling protrusion is lengthwise formed in a longitudinal direction of the shaft.

6. The motor of claim 2, wherein the coupling member is formed so that an outer diameter thereof can be increased towards a lower side of the shaft in a longitudinal direction of the shaft.

7. The motor of claim 6, wherein the increase is gradual.

8. The motor of claim 6, wherein the increase is stepped.

9. The motor of claim 1, wherein the flux barrier is spaced from the permanent magnet.

10. The motor of claim 1, wherein the flux barrier is disposed between two adjacent permanent magnets.

11. The motor of claim 1, wherein each flux barrier is disposed to be adjacent to an outer circumference of the core sheet so that a magnetic flux thereof can not be leaked to an outer circumferential surface of the core block.

12. The motor of claim 1, wherein the anti-deformation rib is penetratingly formed in the flux barrier.

13. The motor of claim 1, wherein the anti-deformation rib is disposed within the flux barrier in a direction of an electromagnetic suction force generated when the motor is rotated.

* * * * *